United States Patent [19]
Cox

[11] 3,782,431
[45] Jan. 1, 1974

[54] ADJUSTABLE ROUTER GUIDE

[76] Inventor: Robert E. Cox, R. R. No. 1, Glencoe, Okla. 74032

[22] Filed: May 11, 1971

[21] Appl. No.: 142,263

[52] U.S. Cl........ 144/144.5, 144/136 C, 144/134 D
[51] Int. Cl............................ B27c 5/10, B23q 35/42
[58] Field of Search..................... 144/144.5, 134 D, 144/136 C, 144 R; 143/6 G

[56] References Cited
UNITED STATES PATENTS

| | | | |
|---|---|---|---|
| 1,115,995 | 11/1914 | Willson............................ | 144/144.5 |
| 876,908 | 1/1908 | Ljunglof........................... | 289/219 X |
| 2,752,961 | 7/1956 | Melgaard......................... | 144/134 D |
| 3,104,689 | 9/1963 | Piper et al. ......................... | 143/6 G |
| 3,635,268 | 1/1972 | Lange.............................. | 144/134 D |

Primary Examiner—Donald R. Schran

[57] ABSTRACT

A tool for use by a carpenter and used particularly in cabinet construction work, the tool comprising a guide for a router and wherein the guide is adjustable, the guide being comprised of a pair of parallel guide bars interconnected by transverse extending adjustable bolts for selectively spacing the guide bars apart, and a plurality of transverse extending clamps extending across the guide bars for locating the router position.

2 Claims, 5 Drawing Figures

PATENTED JAN 1 1974  3,782,431

INVENTOR.
ROBERT E. COX

ADJUSTABLE ROUTER GUIDE

This invention relates generally to carpenter's tools. More specifically the present invention relates to a router guide.

A principal object of the present invention is to provide a router guide that serves as a tool for a carpenter in the production of cabinet work and wherein one piece of the lumber is set into another piece of lumber.

Another object of the present invention is to provide a router guide which is fully adjustable so as to accommodate all sizes of routing operations.

Still another object of the present invention is to provide an adjustable router guide which is easy to adjust in a quick manner and which is accurate to any width of cut that is desired.

Other objects of the present invention are to provide an ajustable router guide which is simple in design, inexpensive to manufacture, rugged in construction, easy to maintain and efficient in operation.

Figure 1:
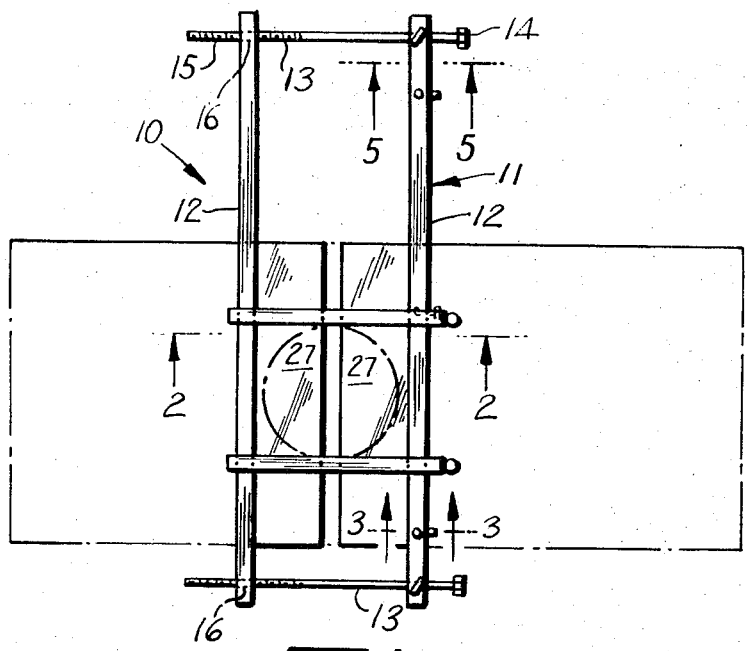
Figure 3:
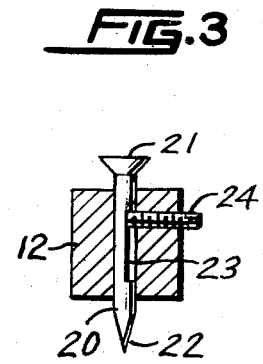
Figure 2:
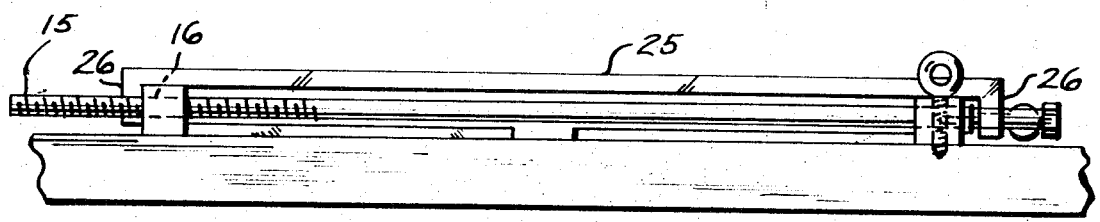
Figure 4:
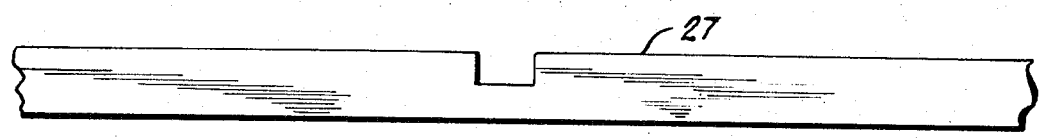
Figure 5:

These and other objects will be readily evident upon a study of the following specification and accompanying drawing wherein:

FIG. 1 is a top plan view of the present invention showing the router and the lumber in phantom lines, FIG. 2 is an enlarged cross sectional view taken along lines 2—2 of FIG. 1, FIG. 3 is an enlarged cross sectional view taken on the line 3—3 of FIG. 1, FIG. 4 is a fragmentary side elevation view of a lumber illustrated after having used the router there upon, and FIG. 5 is an enlarged cross sectional view taken on the line 5—5 of FIG. 1.

Referring now to the drawing in detail, the reference numeral 10 represents an adjustable router guide according to the present invention wherein there is a frame assembly 11 and which includes a pair of elongated, straight guide bars 12 which are maintained in parallel, spaced apart relation to each other by means of a pair of transverse extending adjustment bolts 13 near the opposite ends of the guide bars. Each one of the adjustment bolts 13 includes an enlarged head 14 at one end, the opposite ends of the bolts being externally screw threaded as shown at 15 for threadingly engaging a threaded opening 16 in one of the guide bars. Each one of the guide bars is three quarter inch square in cross sectional configuration, each one of the adjustment bolts being five-sixteenths diameter by 10 inches in length. An eye bolt 17 is threadingly fitted in one of the guide bars 12 and serves as a lock screw for rigidly securing the adjustment bolt respective to the guide bar, as is best shown in FIG. 5 of the drawing. The bolt 13 maybe provided with an annular V-shaped groove 18 there around and into which a tapered point of the eye bolt 17 is receivable for securing fixedly the bolt 13 to the guide bar.

It will now be evident that the eye bolt 17 will retain the guide bar along a fixed lonitudinal position of the bolt while at the same time permitting the bolt to be rotatable respective to the guide bar opening 19.

As shown in FIG. 1 and 3 of the drawing, the router guide is provided having one of the guide bars out fitted with a pair of downwardly extending drive pins 20 which at one end have an enlarged head 21 and which at the opposite end thereof is tapered to a point 22, the drive pin extending through both the upper and lower sides of the guide bar. The drive pin is provided with a flat 23 along one side thereof, the flat being engaged by means of a set screw 24 as shown. The flat or cut 23 along the side of the drive nail is sufficiently long so as to permit the drive pin to be raised or lowered a selected distance and then secured by means of the set screw.

As shown in FIG. 2 of the drawing, as well as in FIG. 1, the adjustable router guide is further provided with a pair of steel clamps 25 each one of which is 8 inches in length and is made of ½ inch square material. Each opposite end of the clamps 25 include a downward extension 26 for being hooked over the outer side of each of the guide bars.

These clamps are used only in cutting a circle. With only one drive pin 20 driven in the work and the router firmly secured between the guide bars 12—12 and the clamps 25—25, the router, clamps and guide bars are rotated around the pivot pin causing the router to cut a perfect circle.

In operative use, with different routers and bits the gage will vary so a person may make his own gage. A piece of ¼ inch thick plywood approximately 6½ inches by 21 inches and with straight edges is laid in between the guide bars, the eye bolts 17 being loosened with the fingers just enough so to turn the bolts 13. Then tighten the bolts 13 firmly against the plywood. With everything laying flat, place the router between the guide bars 12, hold the router tight to left side, push the router to the far end, then to right side and pull. This will give what looks like as shown. Now cut both ends off and discard the ends and the gage is permanent for use. In operative use, with the piece to be cut fastened down firmly, place the invention on top with part number 27 against the right side of part 12, then shift the invention and part number 27 to the line to be cut. Place the other part 27 on the left side. With the piece to be set in place between parts 27, and with parts 17 being only loose enough to turn, the bolts 13 maybe moved with the fingers adjustably just snug. Tighten the eye bolt 17, remove parts 27, place the router between the guide bars 12, hold the router to the left side, push to the far end and then hold to the right and pull the router. Thus the person has finished the operation.

What I claim Is:

1. In an adjustable router guide, the combination of a frame, said frame being comprised of a pair of guide bars in parallel spaced apart relation and interconnected by means of transverse extending bolts, and there being provided a plurality of transverse extending clamps, said clamps each being hooked over the outer side of said guide bars and adjustable securable there along, one of said guide bars is provided with a pair of downward extending drive pins extending transversely there through, each drive pin having a elongated flat along a side engagable by a set screw carried by the guide bar, the upper end of the pin having a enlarged head, and the lower end of said pin being tapered to a point, each clamp comprises an elongated member which at its opposite ends is downwardly turned into a hook for being hooked around the outer side of both said guide bars to secure a router between a pair of clamps and the guide bars.

2. The combination as set forth in claim 1 wherein each of said guide bars comprises an elongated straight member of square cross sectional configuration, each one of said guide bars having a transverse opening there through near each opposite end thereof, one of said guide bars having said transverse openings being threaded and the other of said guide bars having said transverse openings comprising clearance openings, said clearance openings and said threaded openings being adaptable to receive said transverse extending bolts, each of said guide bolts being provided with an annular V-shaped groove for being engaged by an eye bolt threadingly engaged in one of said guide bars for maintaining engagement of said guide bar along a longitudinal position on said bolt while maintaining said bolt to be freely rotatable.

* * * * *